Aug. 1, 1967 R. R. BROOKS 3,334,178

LINE BLANKING APPARATUS FOR COLOR BAR GENERATING EQUIPMENT

Filed June 29, 1965

INVENTOR.
ROBERT R. BROOKS
BY Eugene M. Whitacre
Attorney 3,334,178

LINE BLANKING APPARATUS FOR COLOR BAR GENERATING EQUIPMENT

Robert R. Brooks, Willingboro, N.J., assignor to Radio Corporation of America, a corporation of Delaware Filed June 29, 1965, Ser. No. 467,887
8 Claims. (Cl. 178—5.4)

Figures 1, 2, 3:
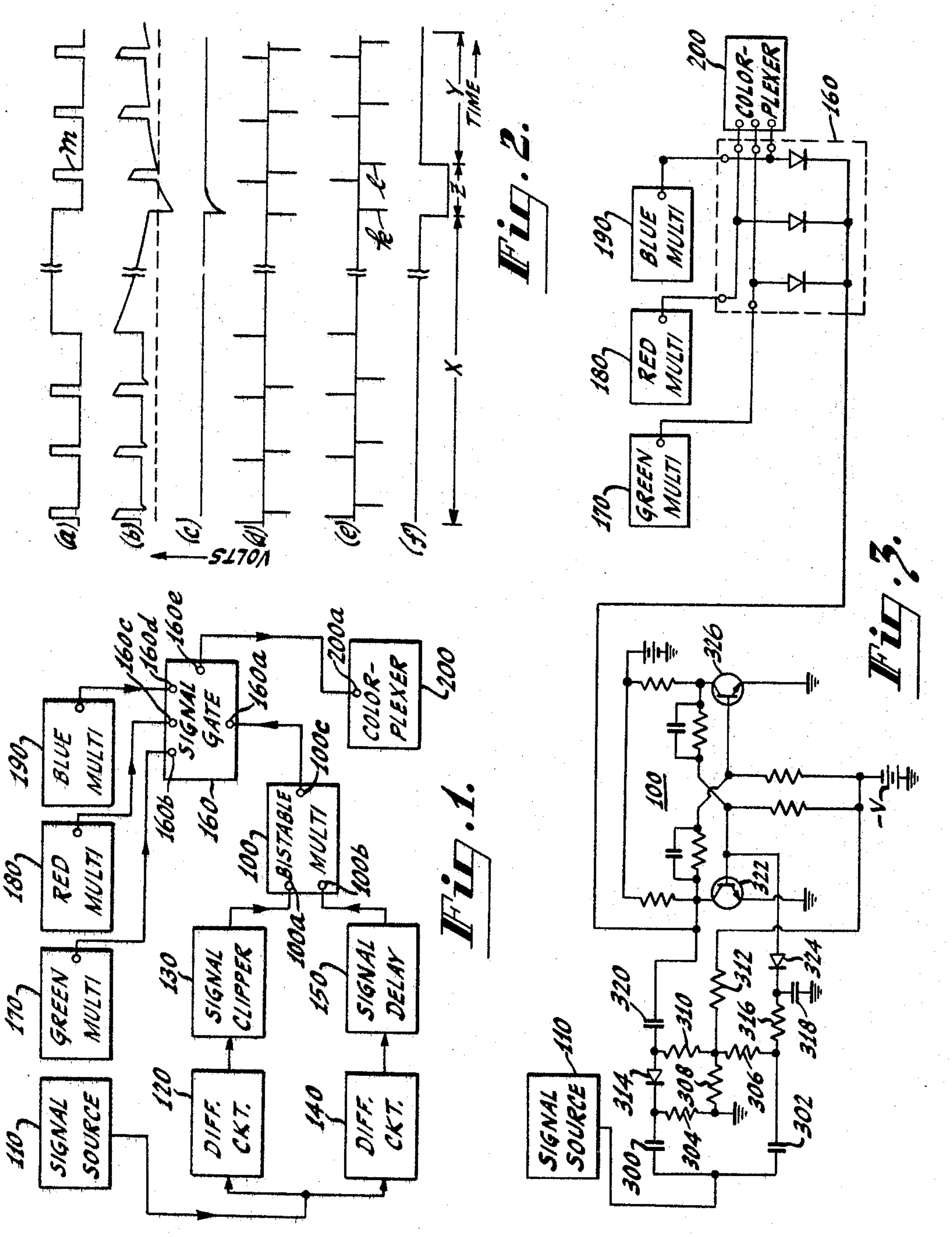

This invention relates to line blanking apparatus for color bar generating equipment and, more particularly, to such apparatus for use with a color bar generator of the type that is triggered by composite blanking signals.

In the past few years, much thought has been given by the television engineer to the idea of operating video signal sources, such as television field, studio, and film cameras and the like, with synchronizing signals and blanking signals only. This is to be contrasted with previous systems which required horizontal and vertical drive signals in addition. Since the blanking signals include pulse components which have the same repetition rate and time duration as these drive signals, the blanking signals can be used to operate the video signal sources, according to this idea, just as the horizontal and vertical drive signals did in the past. Such an arrangement provides for greater economy of system operation in that it requires fewer pulse distribution amplifiers and reduces the amount of cabling between the distribution amplifiers and the signal source units. Such an arrangement, however, has, as will be described below, an adverse effect on color bar generating equipment.

A color bar generator is commonly used in color television broadcasting to facilitate the setting up and adjustment of the colorplexers and color monitors of a color television transmitting system. Basically, it is a piece of test apparatus which generates video waveforms or pulses which, when supplied to the green, red, and blue input circuits of the colorplexer unit, cause a color bar pattern to be displayed by the monitor connected to the colorplexer output. This pattern is to conform to standards set forth by the Electronics Industries Association; that is, the pattern is to comprise a series of vertical color bars which appear on the monitor raster in the descending order of their luminance content. More particularly, a white color bar is to be displayed at that portion of the monitor raster which is closest to its left-hand side, a yellow color bar is to be displayed at the next closest portion, a cyan color bar at the next closest, and so on, through green, magenta, red, and blue color bars, with the blue bar being displayed at that portion of the monitor raster which is closest to its right-hand side.

Many different color bar generator arrangements are known in the prior art. Each, by and large, requires horizontal drive signals, vertical drive signals, synchronizing signals, and blanking signals for its operation. This is because such signals are usually supplied to the color television camera or other video signal source, as was previously mentioned, and because a color bar generator is essentially nothing more than a replacement unit for those apparatus for purposes of test and alignment. In such arrangements, each line of the color bar pattern generated is initiated or triggered by the trailing edge of the horizontal drive signal. Thus, the white, yellow, cyan, etc. color bar information is displayed along each line of the pattern at its proper position with respect to the start of the monitor scanning beam.

Such is not the case, however, where only the synchronizing and blanking signals are supplied to the color television camera type video signal source and to the color bar generator for their operations. Whereas the trailing edge of the horizontal drive signal previously triggered each line of the color bar pattern generated, now it is the trailing edge of the horizontal blanking component which does the triggering. Due to the odd-line type of interlace action adopted for standard television systems, the first line of the pattern generated in every other field of color bar information will originate not at the start of the raster, but at its center. Those bars displayed on this half line will therefore appear, and appear quite noticeably, with their colors displayed; white bar information, for example, may very well be displayed on this half line in the same portion of the raster where green bar information will be displayed on the remaining 262 lines of the field. Masking the monitor at the position where those displaced bars appear does not provide an effective solution for the many instances in which the displayed color bar pattern is decreased in size and shifted about so that other information might be investigated on the monitor at the same time. Besides being objectionable from the standpoint that the resulting color bar pattern gives the impression that the apparatus under test is not operating properly, such misalignment prevents the unit from satisfying the Electronics Industries Associations' standards and specifications respecting color bar generators.

It is an object of the present invention, therefore, to provide line blanking apparatus for color bar generating equipment of the type that is triggered by composite blanking signals. As will become clear hereinafter, such apparatus operates to prevent at least the first line of each field of color bar information from appearing in the displayed color bar pattern.

Thus, in accordance with the invention, line blanking apparatus for color bar generating equipment of the type that is triggered by composite blanking signals includes means for supplying the aforementioned composite blanking signals, including the horizontal and vertical blanking signal components thereof. The line blanking apparatus also includes a first circuit for differentiating the composite blanking signals, a second circuit for differentiating the composite blanking signals, and a bistable multivibrator having first and second stable states. The apparatus additionally includes means for coupling output signals developed by the first differentiating circuit to the multivibrator for switching the multivibrator from its first stable state to its second stable state in response to the trailing edge excursion of the vertical blanking signal component. The line blanking apparatus further includes means for coupling output signals developed by the second differentiating circuit to the multivibrator for switching the multivibrator from its second stable state to its first stable state in response to the trailing edge excursion of a horizontal blanking signal component following the vertical blanking signal component. The apparatus finally includes means controlled by pulse signals developed by the multivibrator for blocking, and thereby deleting from the color bar pattern generated by the color bar equipment, at least the first line of each field of color bar information generated, and for passing, and thereby including in the color bar pattern generated, the remaining lines of each field of color bar information.

For a better understanding of the present invention, together with further objects thereof reference is had to the following description taken in connection with the accompanying drawing, and its scope will be pointed out in the appended claims.

Referring to the drawing:

FIGURE 1 is a block diagram of a line blanking apparatus for color bar generating equipment in accordance with the principles of the present invention;

FIGURES 2(*a*)–2(*f*) are graphic representations of signal waveforms helpful in understanding the operation of the invention; and FIGURE 3 is a schematic circuit diagram, partly in block form, of the line blanking apparatus of FIGURE 1.

In the line blanking apparatus of FIGURE 1, a bistable multivibrator 100 having a pair of input terminals **100*a* and 100*b* and an output terminal 100*c* is provided. Input terminal 100*a* is, as shown, coupled to a source of composite signals 110—a synchronizing waveform generator of conventional construction, for example—via a first differentiating type circuit 120 and a signal clipping circuit 130. Input terminal 100*b* is likewise coupled to the source 110, but via a second differentiating type circuit 140 and a signal delay circuit 150. Output terminal 100*c* is coupled to a control terminal 160*a* of a signal gating circuit 160**.

Gating circuit 160 also has three input terminals **160*b*, 160*c*, 160*d* and an output terminal 160*e*. Input terminals 160*b*, 160*c*, 160*d* are, as shown, directly coupled to the output terminals of the green, red, and blue multivibrators 170, 180, and 190 respectively, of the color bar generating equipment while output terminal 160*e* is coupled to an input terminal 200*a* of a conventional colorplexer unit 200. Although shown as having one output terminal 160*e*, gating circuit 160 has, in fact, three output terminals—one for each of the three signals produced by the color multivibrators 170, 180, and 190. Colorplexer 200, similarly, has three input terminals, though only one, 200*a*, is shown—each for receiving one of the three output signals developed by the gating circuit 160. Only one output terminal of the gating circuit 160 and only one input terminal of the colorplexer 200 are shown solely for simplicity of the drawing. In accordance with conventional color bar generator practice, the blue multivibrator 190 is chosen to operate at twice the rate of the red multivibrator and at four times the rate of the green multivibrator 170** to produce the standard white, yellow, cyan, green, magenta, red, blue color bar pattern on a monitor (not shown) connected to the colorplexer output.

In the operation of the line blanking apparatus of FIGURE 1, signal source 110 supplies composite blanking signals to the differentiating circuits 120 and 140. These signals are shown in FIGURE 2(*a*) and are composite signals in the sense that they include horizontal and vertical blanking components at the standard line and field scanning frequencies. The narrow pulses in FIGURE 2(*a*) represent the horizontal component while the broken, wide pulse represents the vertical component. Although the present invention is hereinafter described in terms of this FIGURE 2(*a*) signal, indicative of the fact that the first scan of the field of information is only one-half a line in length, it will be obvious to those skilled in the art that its teachings would be equally applicable were the supplied blanking signal of a waveform indicating that the first scan were a full line in length. As such, the invention operates in the same manner for each and every field of color bar information generated.

Referring once again to FIGURE 1, the differentiating circuits 120 and 140 are so selected that the former has a relatively long time constant while the latter has a relatively short time constant. More particularly, differentiating circuit 120 is selected to have a time constant such that the signal developed by it in response to the input blanking signals is of the pulse waveform graphically shown in FIGURE 2(*b*). Similarly, differentiating circuit 140 is selected to have a time constant such that its output signal is of the impulse waveform represented in FIGURE 2(*d*). In one particular embodiment of the invention, the time constant associated with the differentiating circuit 120 was chosen to be approximately 1,000 times greater than that associated with the differentiating circuit 140.

The output signal developed by the differentiating circuit 120 (FIGURE 2(*b*)) is coupled via the clipping circuit 130 to the input terminal **100*a* of the multivibrator 100. Clipping circuit 130** is selected to pass only that portion of an applied input signal which exceeds, e.g. goes more negative than, a given predetermined level. Such a level may be represented by the dotted-line in FIGURE 2(*b*), with FIGURE 2(*c*) showing the output signal developed by circuit 130.

The output signal developed by the differentiating circuit 140 (FIGURE 2(*d*)) is coupled via the delay circuit 150 to the input terminal **100*b* of the multivibrator 100. Delay circuit 150 is selected to impart a delay of approximately 0.1 microsecond to the input signal from differentiating circuit 140. The signal developed by the delay circuit 150** in response to this input signal is shown in FIGURE 2(*e*).

Prior to the application of the signal developed by the clipping circuit 130 to its input terminal **100*a*, bistable multivibrator 100 is maintained in one of its two stable states. That stable state is so selected that the signal developed by the delay circuit 150** (FIGURE 2(*e*)) is ineffective to switch the multivibrator 100 during this interval. This follows since multivibrator 100 is so arranged that only pulse excursions of one polarity—negative, for example—are capable of changing the state of multivibrator conduction. Upon application of the signal from the clipping circuit 130 (FIGURE 2(*c*)) to input terminal **100*a* and, more particularly, upon application of the leading, negative going edge of that signal, multivibrator 100 is switched to the other of its two stable states. This signal from circuit 130 is of sufficient energy content and duration to maintain multivibrator 100 in this new, stable condition, even in the presence of a negative pulse supplied during its duration from delay circuit 150 to input terminal 100*b*, which pulse attempts to switch multivibrator 100 back to its original conductive state. Such a pulse from circuit 150** is shown as "*k*" in FIGURE 2(*e*). Multivibrator 100 then continues in this new, stable state until the pulse shown as "*l*" in FIGURE 2(*e*) is supplied by the delay circuit 150 to its input terminal **100*b***. This pulse "*l*" is of correct polarity and of sufficient energy to switch multivibrator 100 back to its initial conductive condition.

The signal developed by multivibrator 100 at its output terminal **100*c* in response to the input signals from circuits 130 and 150** is shown in FIGURE 2(*f*). It will be noted that the leading edge of the negative output pulse signal is time coincident with the trailing edge of the vertical blanking component of the composite blanking signal of FIGURE 2(*a*). It will also be noted that the trailing edge of the output pulse is time coincident with the delayed version of the trailing edge of the horizontal blanking component "*m*" of FIGURE 2(*a*), the delay being by an amount substantially equal to the delay imparted by the circuit 150. This output pulse signal is, as shown in FIGURE 1, coupled to the control terminal **160*a* of the signal gating circuit 160**.

Gating circuit 160 may be of any conventional construction which will couple applied signals from its input terminals **160*b*, 160*c*, 160*d* to its output terminal 160*e*** during the time intervals X and Y of its control signal (FIGURE 2(*f*)), but will not couple such signals during the time interval Z. It may, for example, comprise a normally enabled series gate circuit which will pass signals during the intervals X and Y and will block signals during the interval Z. Or, it may comprise a normally inhibited shunt gate circuit which will operate just the opposite. In either case, any signals generated by the green, red, and blue multivibrators 170, 180, and 190 during the X and Y intervals of the signal of FIGURE 2(*f*) will be coupled from the input terminals **160*b*, 160*c*, and 160*d* to the output terminal 160*e*, and from there to the input terminal 200*a* of the colorplexer unit 200**.

When the color bar generating equipment is of the type that is triggered by composite blanking signals, the green, red, and blue multivibrators 170, 180, and 190 of FIGURE 1 are triggered by the trailing edge of the vertical blanking pulse and by the trailing edge of each and every horizontal blanking pulse. It will be readily apparent from FIGURES 2(*a*) and 2(*f*), therefore, that any and all signals generated by the multivibrators 170, 180, and 190 during the time that the scanning beam of the monitor is traversing the top line of each field of color bar information are prevented from reaching the colorplexer unit 200. The color bar information that would normally appear in that portion of the monitor display is blanked out, as a result, and is deleted from the color bar pattern generated. Thus, the difficulty previously encountered when the first scan of the field of information was only one-half line in length does not here exist. It will also be apparent that by increasing the delay imparted by the delay circuit 150, it is possible to delete more than just the top line of each field of color bar information generated. Such added delay is desirable in that it provides an increase in the stability of operation of the invention.

There is shown in FIGURE 3 a schematic circuit diagram, partly in block form, of the line blanking apparatus shown in FIGURE 1 and described above. Composite blanking signals of the polarity shown in FIGURE 2(*a*) are supplied by signal source 110 to capacitors 300 and 302. Capacitor 300 and resistor 304 comprise the relatively long time constant differentiating circuit 120 of FIGURE 1 while capacitor 302 and resistors 306 and 308 comprise the relatively short time constant differentiating circuit 140. Diode 314, resistors 308, 310, and 312, and potential source —V together comprise the signal clipping circuit 130 of FIGURE 1. These components receive the signal developed by capacitor 300 and resistor 304 at their junction, which signal is of the pulse waveform represented in FIGURE 2(*b*). Integrator circuit resistor 316 and capacitor 318 comprise the signal delay circuit 150 of FIGURE 1. These components receive the signal developed by capacitor 302 and resistor 306 at their junction, shown by the impulse waveform of FIGURE 2(*d*). The signal developed at the junction of the anode of the diode 314 and resistor 310 is of the form shown in FIGURE 2(*c*) and is coupled via the capacitor 320 to the collector electrode of an NPN transistor 322. The signal developed at the junction of resistor 316 and capacitor 318 is of the form shown in FIGURE 2(*e*) and is coupled via the diode 324 to the base electrode of the transistor 322. NPN transistors 322 and 326 in FIGURE 3 comprise the active elements of the multivibrator 100 shown there in schematic form, with the output signal, as shown in FIGURE 2(*f*), being developed at the collector electrode of transistor 322. This output signal is coupled to the dotted box 160 which represents a shunt gate connected across the green, red, and blue multivibrators 170, 180, and 190, respectively. This signal is such as to block at least the first line of each field of color bar information from reaching the colorplexer unit 200 and thereby deletes that information from the color bar pattern displayed on a monitor connected to the colorplexer output (not shown).

Although FIGURE 3 shows the line blanking apparatus as being transistorized, it is not to be implied that the present invention is so limited. As will be obvious to those skilled in the art, the principles of the invention are applicable whether the apparatus of FIGURE 1 employs transistors or vacuum tubes. It will be equally obvious that the polarities selected in FIGURE 2 and FIGURE 3 are illustrative only and by no means limit the scope of the invention.

What is claimed is:

1. Line blanking apparatus for color bar generating equipment of the type that is triggered by composite blanking signals, comprising:

- means for supplying said composite blanking signals, including the horizontal and vertical blanking signal components thereof;
- a first circuit for differentiating said composite blanking signals;
- a second circuit for differentiating said composite blanking signals;
- a bistable multivibrator having first and second stable states;
- means for coupling output signals developed by said first differentiating circuit to said multivibrator for switching said multivibrator from its first stable state to its second stable state in response to the trailing edge excursion of said vertical blanking signal signal component;
- means for coupling output signals developed by said second differentiating circuit to said multivibrator for switching said multivibrator from its second stable state to its first stable state in response to the trailing edge excursion of a horizontal blanking signal component following said vertical blanking signal component;
- and means controlled by pulse signals developed by said multivibrator for blocking, and thereby deleting from the color bar pattern generated by said equipment, at least the first line of each field of color bar information generated and for passing, and thereby including in the color bar pattern generated, the remaining lines of said field of color bar information.

2. Line blanking apparatus for color bar generating equipment of the type that is triggered by composite blanking signals, comprising:

- means for supplying said composite blanking signals, including the horizontal and vertical blanking signal components thereof;
- a first circuit for differentiating said composite blanking signals;
- a second circuit for differentiating said composite blanking signals, said second circuit having a time constant substantially less than that of said first circuit;
- a bistable multivibrator having first and second stable states;
- means including a signal clipping circuit coupling said first differentiating circuit to said multivibrator for switching said multivibrator from its first stable state to its second stable state coincident with the trailing edge of said vertical blanking signal component;
- means including a signal delay circuit coupling said second differentiating circuit to said multivibrator for switching said multivibrator from its second stable state to its first stable state coincident with the trailing edge of a horizontal blanking signal component following said vertical blanking signal component delayed by an amount substantially determined by said delay circuit;
- and means including a signal gating circuit controlled by pulse signals developed by said multivibrator for blocking, and thereby deleting from the color bar pattern generated by said equipment, at least the first line of each field of color bar information generated and for passing, and thereby including in the color bar pattern generated, the remaining lines of said field of color bar information.

3. Line blanking apparatus for color bar generating equipment of the type that is triggered by composite blanking signals, comprising:

- means for supplying said composite blanking signals, including the horizontal and vertical blanking signal components thereof;
- a first circuit for differentiating said composite blanking signals;
- a second circuit for differentiating said composite blanking signals, said second circuit having a time constant substantially less than that of said first circuit;
- a bistable multivibrator having first and second stable states;
- means including a signal clipping circuit coupling said first differentiating circuit to said multivibrator for switching said multivibrator from its first stable state to its second stable state coincident with the trailing edge of said vertical blanking signal component;

means including a signal delay circuit coupling said second differentiating circuit to said multivibrator for switching said multivibrator from its second stable state to its first stable state coincident with the trailing edge of the first horizontal blanking signal component following said vertical blanking signal component delayed by an amount substantially determined by said delay circuit;

and means including a signal gating circuit controlled by pulse signals developed by said multivibrator for blocking, and thereby deleting from the color bar pattern generated by said equipment, the first line of each field of color bar information generated and for passing, and thereby including in the color bar pattern generated, the remaining lines of said field of color bar information.

4. Line blanking apparatus for color bar generating equipment of the type that is triggered by composite blanking signals, comprising:

means for supplying said composite blanking signals, including the horizontal and vertical blanking signal components thereof;

a first circuit for differentiating said composite blanking signals;

a second circuit for differentiating said composite blanking signals, said second circuit having a time constant substantially less than that of said first circuit;

a bistable multivibrator having first and second stable states;

means including a signal clipping circuit coupling said first differentiating circuit to said multivibrator for switching said multivibrator from its first stable state to its second stable state coincident with the trailing edge of said vertical blanking signal component;

means including a signal delay circuit coupling said second differentiating circuit to said multivibrator for switching said multivibrator from its second stable state to its first stable state coincident with the trailing edge of the first horizontal blanking signal component following said vertical blanking signal component delayed by an amount substantially determined by said delay circuit;

and means including a normally enabled series gating circuit controlled by pulse signals developed by said multivibrator for blocking, and hereby deleting from the color bar pattern generated by said equipment, the first line of each field of color bar information generated and for passing, and thereby including in the color bar pattern generated, the remaining lines of said field of color bar information.

5. Line blanking apparatus according to claim 4 in which said normally enabled series gating circuit is inhibited by, and for the duration of, said pulse signals developed by said multivibrator.

6. Line blanking apparatus for color bar generating equipment of the type that is triggered by composite blanking signals, comprising:

means for supplying said composite blanking signals, including the horizontal and vertical blanking signal components thereof;

a first circuit for differentiating said composite blanking signals;

a second circuit for differentiating said composite blanking signals, said second circuit having a time constant substantially less than that of said first circuit;

a bistable multivibrator having first and second stable states;

means including a signal clipping circuit coupling said first differentiating circuit to said multivibrator for switching said multivibrator from its first stable state to its second stable state coincident with the trailing edge of said vertical blanking signal component;

means including a signal delay circuit coupling said second differentiating circuit to said multivibrator for switching said multivibrator from its second stable state to its first stable state coincident with the trailing edge of the first horizontal blanking signal component following said vertical blanking signal component delayed by an amount substantially determined by said delay circuit;

and means including a normally inhibited shunt gating circuit controlled by pulse signals developed by said multivibrator for blocking, and thereby deleting from the color bar pattern generated by said equipment, the first line of each field of color bar information generated and for passing, and thereby including in the color bar pattern generated, the remaining lines of said field of color bar information.

7. Line blanking apparatus according to claim 6 in which said normally inhibited shunt gating circuit is enabled by, and for the duration of, said pulse signals developed by said multivibrator.

8. Line blanking apparatus for color bar generating equipment of the type that is triggered by composite blanking signals, comprising:

means for supplying said composite blanking signals, including the horizontal and vertical blanking signal components thereof;

a first circuit having a relatively long time constant for differentiating said composite blanking signals;

a second circuit having a relatively shirt time constant for differentiating said composite blanking signals;

a bistable multivibrator having first and second stable states;

means including a signal clipping circuit coupling said first differentiating circuit to said multivibrator for switching said multivibrator from its first stable state to its second stable state coincident with the trailing edge of said vertical blanking signal component;

means including a signal delay integrator circuit coupling said second differentiating circuit to said multivibrator for switching said multivibrator from its second stable state to its first stable state coincident with the trailing edge of the first horizontal blanking signal component following said vertical blanking signal component delayed by an amount substantially determined by said delay circuit;

and means including a diode gating circuit controlled by pulse signals developed by said multivibrator for blocking, and thereby deleting from the color bar pattern generated by said equipment, the first line of each field of color bar information generated from the signals developed by the green, red, and blue multivibrators of the color bar generating equipment and for passing, and thereby including in the color bar pattern generated, the remaining lines of said field of color bar information.

No references cited.

JOHN W. CALDWELL, *Acting Primary Examiner.*

J. A. O'BRIEN, *Assistant Examiner.*